(12) United States Patent
Ashe

(10) Patent No.: US 6,282,651 B1
(45) Date of Patent: *Aug. 28, 2001

(54) SECURITY SYSTEM PROTECTING DATA WITH AN ENCRYPTION KEY

(76) Inventor: Vincent Ashe, Emeara Lodge Tormore Glencar, Co. Sligo (IE)

(*) Notice: Subject to any disclaimer, the term of this patent is extended or adjusted under 35 U.S.C. 154(b) by 0 days.

This patent is subject to a terminal disclaimer.

(21) Appl. No.: 09/415,189

(22) Filed: Oct. 7, 1999

Related U.S. Application Data

(62) Division of application No. 08/896,183, filed on Jul. 17, 1997, now Pat. No. 6,014,745.

(51) Int. Cl.[7] .............................. G06F 12/14; H04L 9/14; H04L 9/32
(52) U.S. Cl. .................. 713/193; 713/185; 380/281; 380/283
(58) Field of Search .................... 713/183, 185, 713/190, 193; 380/281, 283

(56) References Cited

U.S. PATENT DOCUMENTS

| | | | |
|---|---|---|---|
| 5,142,578 | * | 8/1992 | Matyas et al. ................... 380/21 |
| 5,894,516 | * | 4/1999 | Brandenburg ...................... 380/4 |
| 5,999,629 | * | 12/1999 | Heer et al. ....................... 380/49 |
| 6,014,745 | * | 1/2000 | Ashe ............................. 713/193 |
| 6,069,957 | * | 5/2000 | Richards ......................... 380/281 |

* cited by examiner

*Primary Examiner*—Tod Swann
*Assistant Examiner*—Justin T. Darrow
(74) *Attorney, Agent, or Firm*—Richard K Robinson

(57) ABSTRACT

Proprietary information such as programs and/or data are protected using a secure processing system that includes a memory such as an EPROM in which the proprietary information is stored in a first portion of the memory. The stored information is encrypted by an encryption algorithm unique to the proprietor of the information. The stored information is assigned an unique key that will enable the information to be decrypted if the unique algorithm is known. A second portion of the memory has the unique key stored therein, the unique key is encrypted with a master encryption algorithm and can only be obtained by using a master key with the master algorithm. A processing unit such as a Digital Signal Processor (DSP) has both the proprietor's unique algorithm, master algorithm and master key available to it. The processing unit can retrieve the information from the memory and execute it after decrypting the unique key using the master algorithm and the master key and then decrypting the information using the unique algorithm and the unique key.

12 Claims, 4 Drawing Sheets

SECURITY SYSTEM PROTECTING DATA WITH AN ENCRYPTION KEY

CROSS REFERENCE TO RELATED APPLICATION

This is a divisional of application Ser. No. 08/896,183 filed Jul. 17, 1997, U.S. Pat. No. 6,014,745.

BACKGROUND OF THE INVENTION

This invention relates to a method of protecting information stored in a memory device such as an EPROM.

The manufacturers of Digital Signal Processors (DSPs), as a service to their customers, will manufacture the DSP to operate with the customer's own proprietary programs. As a part of that service, the manufacturers attempt to protect the customer's proprietary information. In some cases, the proprietary information is stored external to the DSP in memories such as EPROMs, masked ROMs, CDs and even floppy discs. The DSPs are mass produced and are not unique to any particular customer. Any customer may develop a program to run on the DSP by using the DSP's unique OP-Codes. The concern that a customer has is that, after a substantial investment in time and money developing a proprietary program, a competitor or even a program pirate may obtain his program by purchasing a copy of it and a DSP and then extracting the program.

One way of protecting proprietary programs is to encrypt them prior to their being read. U.S. Pat. No. 4,764,959 disclosed a single-chip microcomputer with an encryption function that encrypts the contents of the memory for secrecy protection when the programs stored in a Read Only Memory (ROM) are read to the outside. However, it is quite simple to reverse engineer the ROM and determine the program by observing the state of each memory cell of the ROM.

Smart Card manufacturers also have developed many techniques for authenticating (a form of encryption) the validity of data stored in a smart card's memory. For example, U.S. Pat. No. 5,343,530 disclosed one method.

SUMMARY OF THE INVENTION

Proprietary information such as programs and/or data are protected using a secure processing system that includes a memory, such as an EPROM, in which the proprietary information is stored in a first portion of the memory. The stored information is encrypted by an encryption algorithm unique to the proprietor of the information. The stored information is assigned an unique key that will enable the information to be decrypted if the unique algorithm is known. A second portion of the memory has the unique key stored therein. The unique key is encrypted with a master encryption algorithm and can only be obtained by using a master key with the master algorithm. A processing unit such as a Digital Signal Processor (DSP) has both the proprietor's unique algorithm, master algorithm and master key available to it. The processing unit can retrieve the information from the memory and execute it after decrypting the unique key using the master algorithm and the master key and then decrypting the information using the unique algorithm and the unique key.

The processing unit has an access port for accessing the information stored in the memory unit. A second processing unit, such as a personal computer, can be connected to the access port and an operator can enter the unique key. The second processing unit can then retrieve the encrypted information by providing the DSP with the unique key. The DSP will decipher the encrypted information using the proprietary algorithm and the unique key and then passes the decrypted programs and/or data to the second processing unit.

For security purposes, the master program is very complex but the unique algorithm is less complex than the master algorithm.

The security system may also be used for smart cards. A smart card provider will have its own proprietary algorithm and key and each card holder will have their own unique key and algorithm such as a Personal Identification Number (PIN). The card holder will enter his card into a DSP device such as a cash machine and enter his PIN in the machine. The smart card has the PIN that has been encrypted by a master algorithm stored in a portion of the memory of the smart card. The DSP retrieves and deciphers the encrypted PIN and compares it to the PIN that the card holder had entered. If the comparison is correct, then the data stored in the smart card is transferred and deciphered in the manner discussed above. The card holder can then carry out the desired transaction.

DETAILED DESCRIPTION OF THE INVENTION

Figure 1:
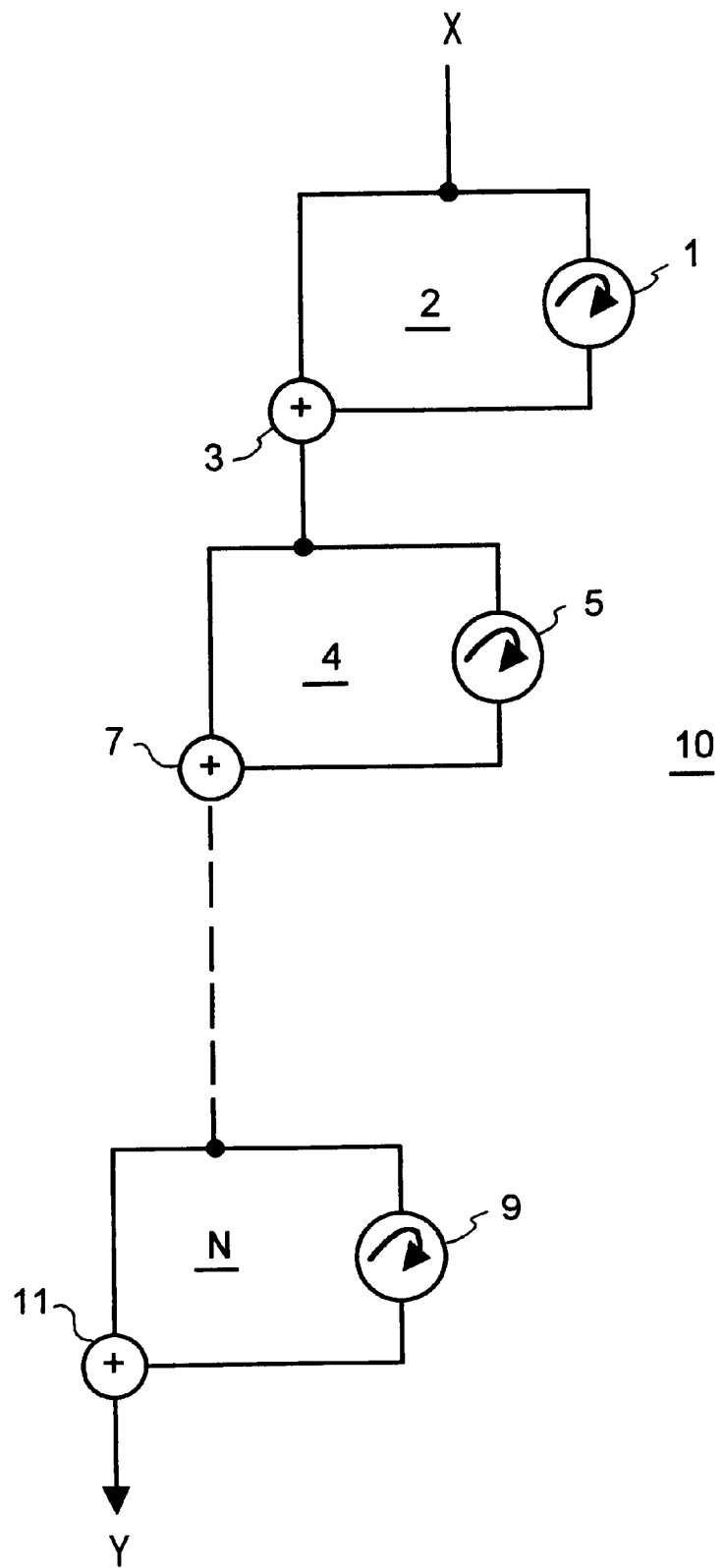
FIG. 1 is a schematic diagram of an encryption algorithm.

FIG. 1 is a schematic diagram of a simplified encryption algorithm 10, which is provided for illustrative purposes. The encryption algorithm 10 has a plurality of stages 2, 4 . . . N. The larger the value of N or the greater the number of stages the more complex the encryption algorithm. Each stage has an operation such as 1 for stage 2, operation 5 for stage 4 and operation 9 for stage N. The operation will shift the bit stored in that stage in a first direction for a defined number of bits or in a second direction for a defined number of bits depending upon the key that defines the shift direction and magnitude of the shift. The key word controls the operation including the direction and magnitude of the shift. The output of each stage is the combination of the operated bit with the unoperated bit. Thus, adder 3 combines x with x', the operated bit and applies it to stage 4 where operator 5 operates on it according to the key bit for that stage. Adder 7 combines x+x' with (x+x')' which summation is applied to the next stage where the process is repeated. However, the operator for each stage is under the control of a key bit. The final stage N after completion of the operation by operator 9 and the summation by the adder 11 provides as an output Y which is the encryption of x by algorithm E according to key K or Y=E(K,x).

Figure 2:
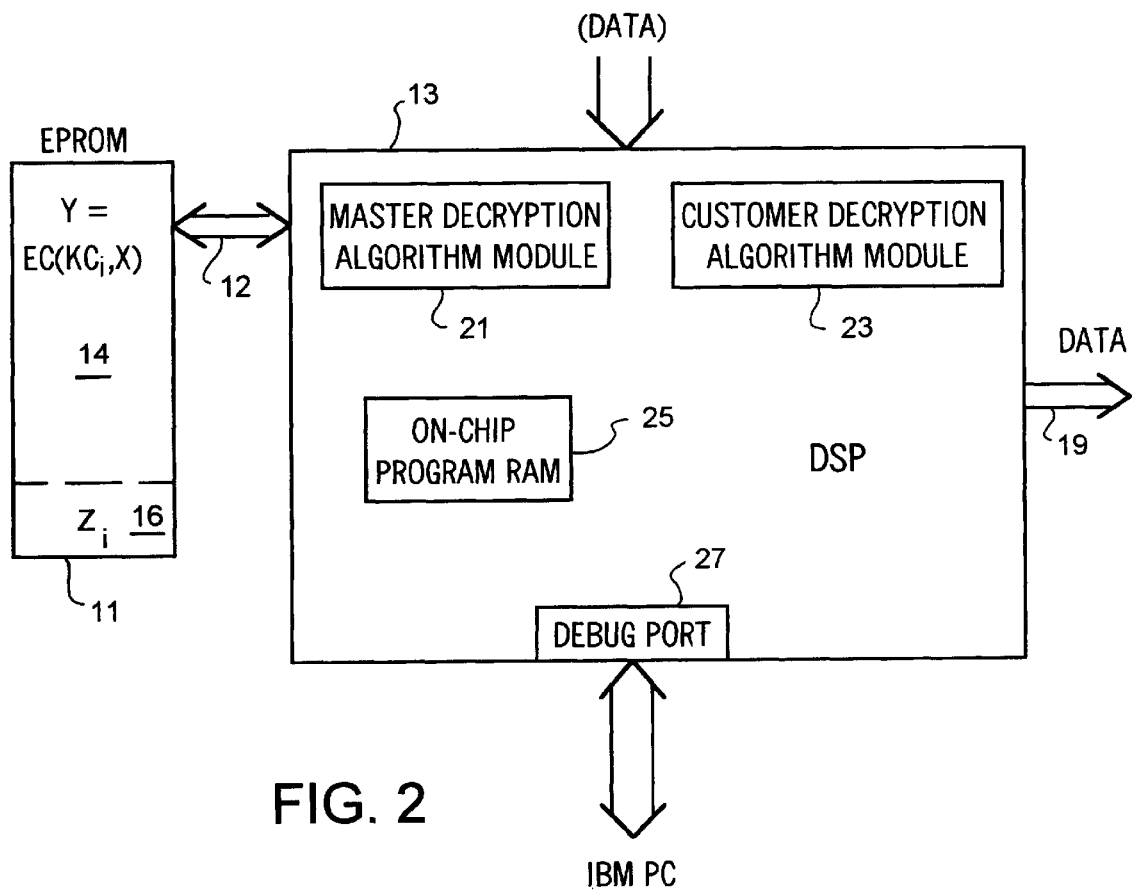
FIG. 2 is a block diagram of the security system according to the invention; and, FIG. 3 is a block diagram of an alternate embodiment of the invention.

FIG. 2 is a block diagram of a secure system according to the invention in which encrypted information Y is stored in first section 14 of a memory 11 such as an EPROM, masked ROM, Compact Disc (CD) or even a floppy disc. The memory 11 has a second section 16 in which an encrypted Key Zi is stored. In one embodiment the encrypted information is a proprietary program X developed to operate a DSP 13. The encrypted program Y is encrypted by an unique algorithm Ec and Key Kci known only to the proprietor of the program and the manufacturer of the DSP 13. In general, the algorithm Ec is selected for speed in order for the encrypted program Y to be rapidly deciphered by the DSP 13. Therefore, its complexity will be limited. To enhance the security of the system the Key Kc is encrypted by a complex algorithm Em known only to the manufacturer of the DSP with a Key Km also known only to the manufacturer of the DSP.

The DSP reads Zi, the encrypted Kc, from the memory II via connector 12 and deciphers it with the master decryption algorithm module 21. After the Key Kc is deciphered the DSP reads the encrypted program Y with the customer decryption algorithm module 23. The program is stored in the on-chip program RAM 25 and the DSP execute the program on data provided on input 17 and provides the modified data as an output on bus 19.

The program developer may want to debug the program so there is a debug port 27 provided. A personal computer PC may be connected to the debug port 27 and input the Key Kc to obtained a copy of the deciphered programmed.

As an alternative the algorithm Ec may be encrypted and stored in the section 16 and the Key retained in the DSP 13. The operation would be essentially the same as described above.

Figure 3:
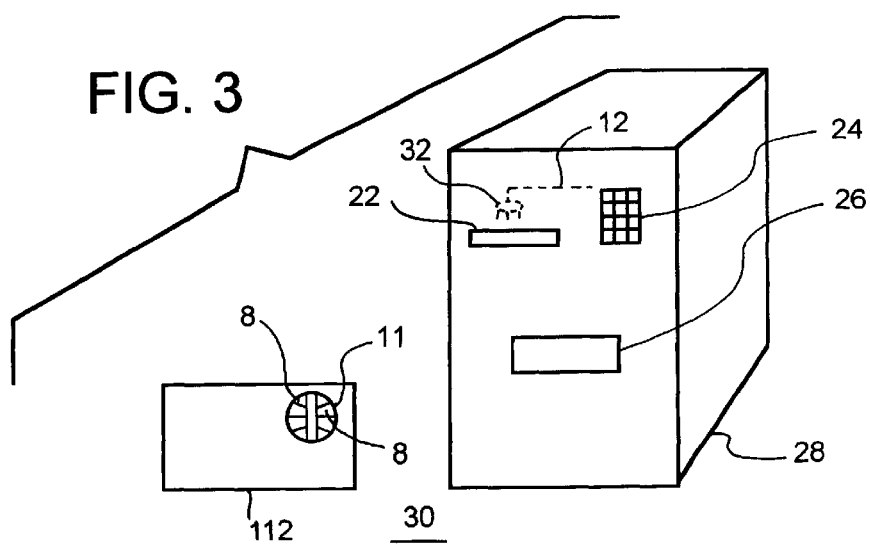

FIG. 3 is an alternate embodiment of the secured system of FIG. 2. In FIG. 3, a microprocessor (not shown) similar to DSP 13 is included as part of a smart card system 30. The memory II is mounted on a card 112 which is designed to be inserted into a slot 26. The memory has conductors 8 which, as known in the art (such as in U.S. Pat No. 4,382,279 which is incorporated herein by reference) when placed into the slot 22 contact with contractors 32, allow a machine 28 such as a cash machine having a microprocessor mounted within it to read the memory 11. In this embodiment, the card holder enters his key via keypad 24. After verification that the entered key is the same as the encrypted key, the machine 28 will allow the card holder to conduct transactions and obtain cash via dispenser 26.

Figure 4A:
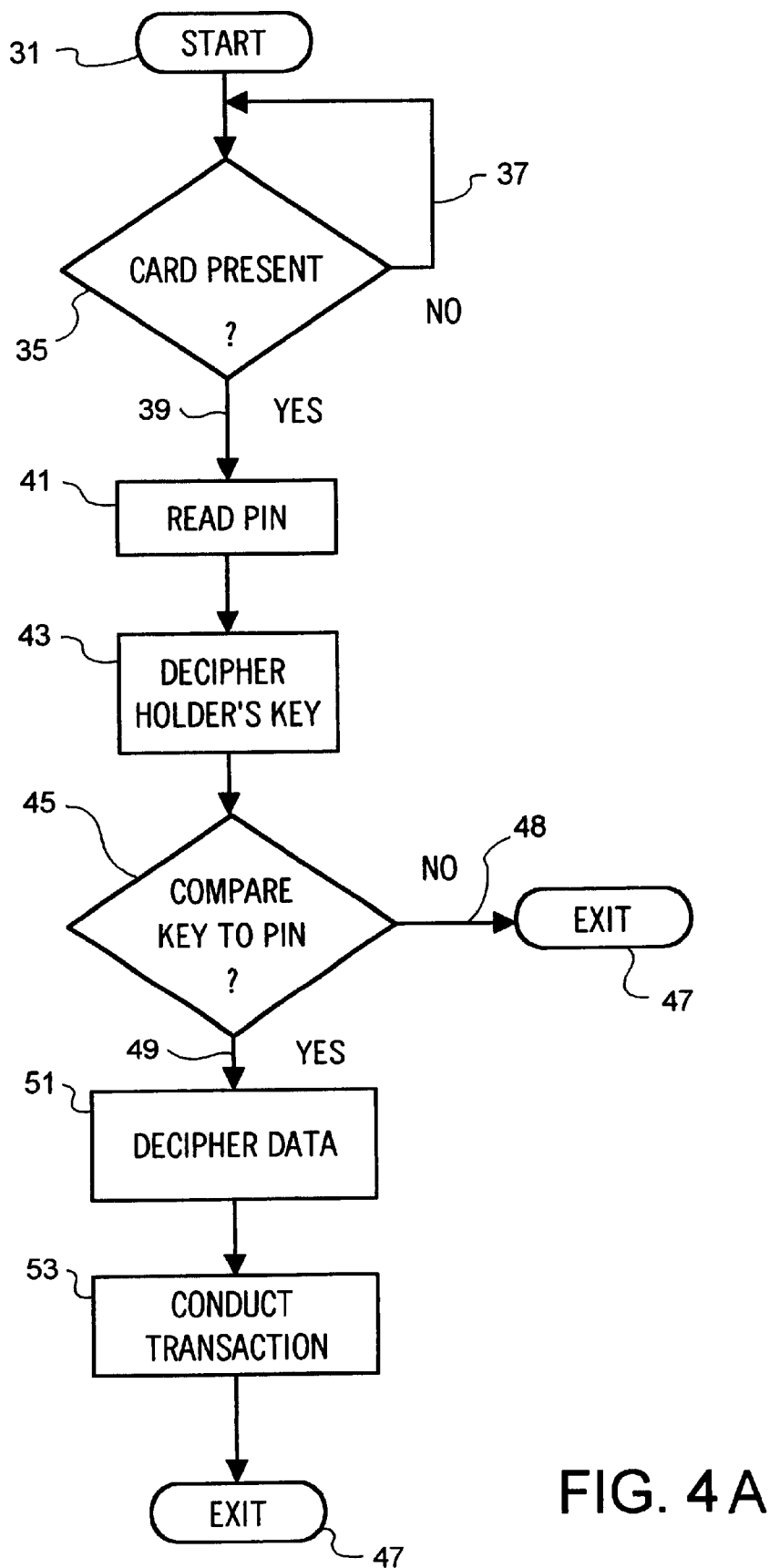
FIGS. 4a and 4b are flow charts for executing the alternative embodiment of the invention.
Figure 4B:
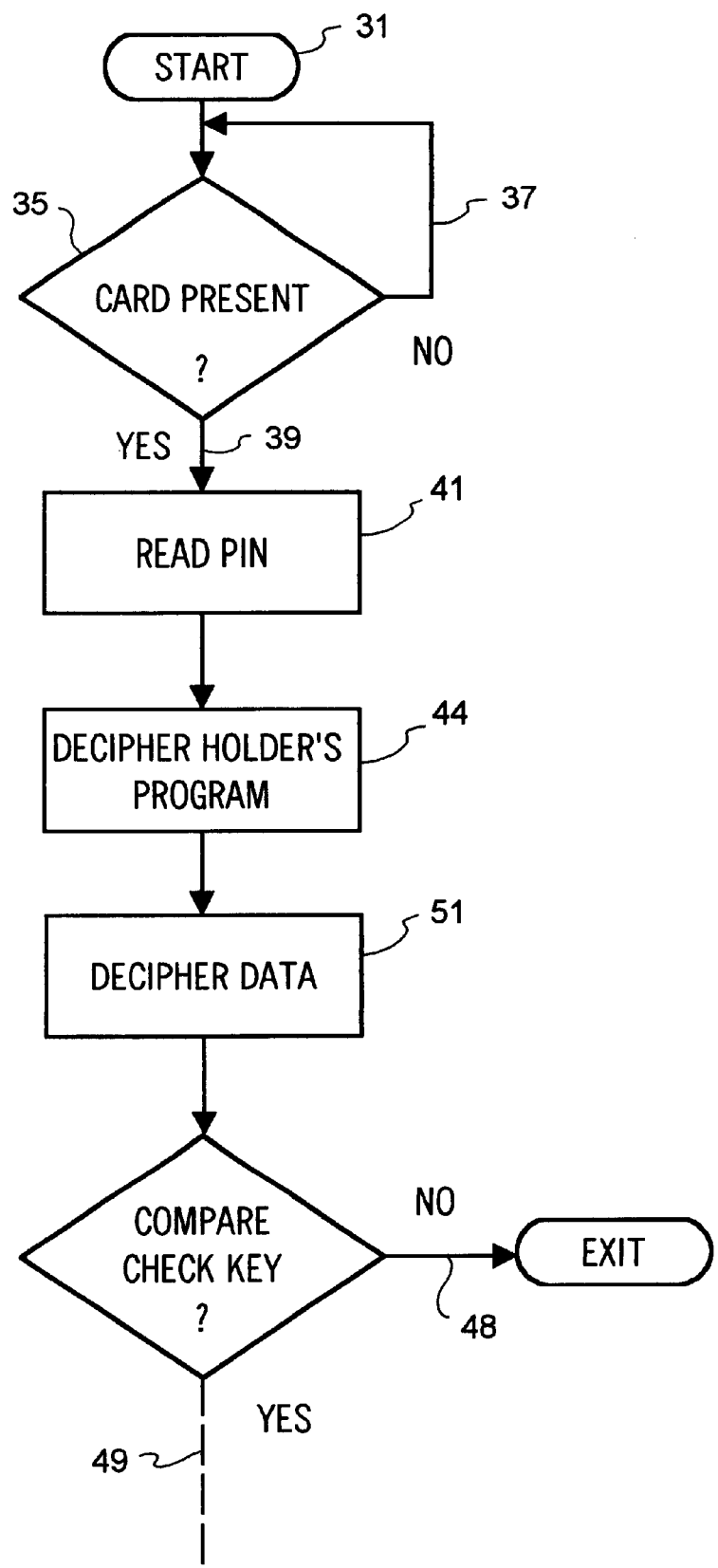

The flow chart for executing the above transactions is illustrated in FIG. 4 a to which reference should now be made. After start at block 31, the microprocessor 113 checks to see if a card is present in the slot 22. If present, the microprocessor obtains the holders PIN a block 41 via the keypad 24 and the port 27 of machine 28. Following the entry of the PIN, the holders Key is deciphered using the Master decryption algorithm module 21 at block 43. If the PIN does not equal the Key then at decision block 45 the NO line 48 is taken to the program exits at exit 47. If the PIN is equal to the deciphered Key then the YES line 49 is taken and the encrypted information stored in the memory 11 is deciphered by the customer decryption algorithm module 23 ad block 51. The transaction is completed at block 53 following which the system exits the program at block 47.

Finally, both the memory 11 and processing unit may be mounted on the same card. Utilizing the teachings of this invention, the embodiment of U.S. Pat No. 4,382,279 disclosed the memory and processor on the same card, may be substantially improved by incorporating the security system disclosed herein.

I claim:

1. A security system for protecting data stored in a memory unit, comprising:

the memory unit having a first portion with encrypted data stored therein, the data being encrypted by a first encryption algorithm using a first key, and a second portion having stored therein an encryption of the first key, the first key being encrypted by a second algorithm using a second key; and means for decrypting the first key using the second algorithm and the second key and for decrypting the data using the first key and first algorithm.

2. The system according to claim 1, wherein the means for decrypting the first key and for decrypting the data comprises:

a processing unit including a means for electrically connecting the processing unit to the memory unit, the processing unit having stored therein the first algorithm, and the second algorithms, the processing unit retrieving the data from the memory unit after retrieving and decrypting the first key using the second algorithm and the second key and then decrypting the data using the first algorithm and the first key.

3. The system according to claim 2, wherein: the processing unit includes an access port for accessing the memory unit, and the security system further comprises:

a second processing unit electrically connected to the access port, the second processing unit includes a second memory having stored therein the first key, the second processing unit retrieving the encrypted data by providing the processing unit with the first key to decrypt the encrypted data using the first algorithm and the first key and thereafter passing the decrypted data to the second processing unit.

4. The system according to claim 2, wherein: the encrypted data comprises a program that is executed by a second processing unit following decryption of the data in the first portion.

5. The memory unit according to claim 2, further comprising: the encrypted data including encrypted information used by the processing unit following decryption of the data in the first portion.

6. The memory unit according to claim 1, wherein the second algorithm comprises a plurality of N stages with each stage defining an encryption process and the first algorithm comprises a plurality of M stages where M and N are positive integers and M is a smaller number than N.

7. A system for protecting data stored in a memory unit encased in a card, comprising:

a plurality of conductors disposed on a first face of the card, the conductors being electrically connected to the memory unit, and the memory unit having a first portion with encrypted data stored therein, the data being encrypted by a first encryption algorithm using a first key, and a second portion having stored therein an encryption of the first key, the first key being encrypted by a second algorithm using a second key;

means for decrypting the first key using the second algorithm and the second key and for decrypting the data using the first key and first algorithm.

8. The system according to claim 7, wherein the means for decrypting further comprises:

a processing unit mounted within a case having a slot for receiving the card and including conductors for connecting the contacts of the memory unit to the processing unit, the processing unit having stored therein the first algorithm, the first key and the second algorithm, so that when the card is disposed in the slot of the processing unit, the processing unit retrieving the encrypted data from the memory unit after decrypting the first key using the second algorithm and the second key and then decrypting the data using the first algorithm and the first key.

9. The system according to claim 8, further comprising:

a key pad for entry of a key into the processing unit;

means for comparing the decrypted first key with the entered key; and means for enabling decrypting of the encrypted data when the decrypted first key is the same as the entered key.

10. The system according to claim 8, wherein the processing unit has a second access port, and the system further comprises:

a second processing unit electrically connected to the second access port;

the first key being stored in a second memory in the second processing unit, the encrypted data being retrieved by the second processing unit by providing the processing unit with the first key and the processing unit decrypts the encrypted data using the first algorithm and the first key and then passes the decrypted data to the second processing unit.

11. The memory unit according to claim 8, further comprising: the encrypted data being an encrypted program executed by the processing unit following decryption of the program.

12. The system according to claim 7, wherein the second algorithm comprises a plurality of N stages with each stare defining an encryption process and the first algorithm comprises a plurality of M stages where M and N are positive integers and M is a smaller number than N.

* * * * *